US011185966B2

(12) United States Patent
Yestrau (10) Patent No.: US 11,185,966 B2
(45) Date of Patent: Nov. 30, 2021

(54) HYBRID TOOL PINS (71) Applicant: The Boeing Company, Chicago, IL (US)

(72) Inventor: John E. Yestrau, Winnipeg (CA)

(73) Assignee: The Boeing Company, Chicago, IL (US)

(*) Notice: Subject to any disclaimer, the term of this patent is extended or adjusted under 35 U.S.C. 154(b) by 883 days.

(21) Appl. No.: 15/425,926

(22) Filed: Feb. 6, 2017

(65) Prior Publication Data
US 2018/0222025 A1 Aug. 9, 2018

(51) Int. Cl.
B25B 27/02 (2006.01)
B29C 70/54 (2006.01)
B29C 37/00 (2006.01)
B25B 27/06 (2006.01)
F16B 13/04 (2006.01)

(52) U.S. Cl.
CPC .............. B25B 27/02 (2013.01); B25B 27/06 (2013.01); B29C 37/0003 (2013.01); B29C 70/543 (2013.01); F16B 13/04 (2013.01)

(58) Field of Classification Search
CPC ....... B25B 27/02; B25B 27/023; B25B 27/04; B25B 27/06; B25B 27/062; B25B 27/08; F16B 2001/002; F16B 2019/006; F16B 19/002; F16B 19/008; F16B 19/02; F16B 13/045; B29C 70/543; B29C 33/12; B29C 33/123
USPC ...................................................... 425/502
See application file for complete search history.

(56) References Cited

U.S. PATENT DOCUMENTS 2,075,714 A * 3/1937 Hamill .................. F16B 13/068
411/24
3,719,119 A * 3/1973 Straub ................. B25B 27/0007
411/34
4,659,126 A * 4/1987 Breck ................... B25B 27/023
269/48.1
(Continued)

FOREIGN PATENT DOCUMENTS

DE 4219761 A1 * 12/1993 .............. F16F 1/445

OTHER PUBLICATIONS xapps.xylemic.com, "Hardness of metals and minerals", Accessed Jul. 28, 2020. (Year: 2020).*
(Continued)

Primary Examiner — Timothy Kennedy
Assistant Examiner — Sonny V Nguyen
(74) Attorney, Agent, or Firm — Haynes and Boone, LLP (57) ABSTRACT A re-useable, easily removable tool pin features a non-stick outer surface with a harder inner core configured to be gripped by a removal tool for extraction of the tool pin, without damage, from a mold and from composite plies that may have cured in contact with the tool pin. The tool pin prevents insertion into the mold such that the extractor tool is not attachable to the tool pin. A system includes the tool pin, a mold for forming a molded part, the mold having holes for insertion of tool pins, and an extractor tool adapted to grip the tool pin for removal from the mold and molded part. The extractor tool can be ergonomically designed for easy removal of the tool pin by hand. Such tool pins are adapted for production of parts from composite materials in many industries, including aerospace, automotive, transportation, agricultural, and energy.

20 Claims, 7 Drawing Sheets (56) References Cited

U.S. PATENT DOCUMENTS

| | | | | |
|---|---|---|---|---|
| 5,362,185 | A | * | 11/1994 | Haack ................... B25B 27/023 |
| | | | | 411/324 |
| 2006/0011294 | A1 | * | 1/2006 | Rajabali ................ B29C 70/088 |
| | | | | 156/307.7 |
| 2008/0175686 | A1 | * | 7/2008 | Wallek .................. F16B 13/045 |
| | | | | 411/44 |
| 2008/0226413 | A1 | * | 9/2008 | Stephen ................. F16B 37/12 |
| | | | | 411/82.1 |
| 2016/0327161 | A1 | * | 11/2016 | Sato ..................... F16J 15/3488 |

OTHER PUBLICATIONS

Gurtler, Hubert, "Machine translation of DE 4219761 A1", Translated Nov. 3, 2020, Espacenet.com (Year: 2020).*

* cited by examiner

HYBRID TOOL PINS

TECHNICAL FIELD

The present disclosure relates generally to tools for composite materials manufacture and, more particularly, to a locator pin tool that is easily removable from a mold tool structure and molded part in the fabrication of composite parts.

BACKGROUND

Tool pins are used during the fabrication of composite parts in order to locate pre-cured plies, and also to create tool tab holes which are used after curing to index the part for trimming, handling or assembly operations. Generally, in the aerospace industry, most composite part production requires a mold for duplicating the surface that is to be created with the composite part. Typically, a metal mold or mandrel is a metal tool that has the contour of the part that is to be duplicated when producing the composite part. Molds can be made in many different shapes and sizes, and can be relatively simple or complex, e.g., a one-piece mold, sometimes referred to as a mandrel and used to form a single surface of the part, or a two-piece mold that can be used to form both inner and outer surfaces of a part. For example, for molding a panel on the exterior of an airplane, the surface seen on the exterior of the airplane is called an outer mold surface, and the surface of the mold will duplicate that surface (also called the outer mold line). The part is then built on the mold by applying layers of composite material—such as plies of carbon fiber cloth material impregnated with plastic resin—to the mold and allowing the plies to cure or bond together before removing the part from the mold.

In a common method of manufacture, many layers of composite plies may be applied to the mold, and each of the plies used to lay up a part may have a tool tab, which is a little extra piece of material that sticks out from the main body of the part. Each tool tab has a hole sized to fit precisely over a tool pin protruding from the mold so that each composite ply can be positioned in a correct location on the mold. When the part is removed from the mold, the part includes the tool tab and its hole, which may be used as an exact point of reference to the surface of the part, e.g., for indexing the part for trimming, handling, or assembly operations. For example, the tool tab holes may be used to index the part to a trimming tool used to trim excess material from the part after curing in an autoclave. The tool tab may be sacrificial and may be removed or trimmed off before or after final assembly of the part to the finished product.

Tool pins are dimensioned to fit snugly or tightly into the holes provided for them in the mold at exact locations. A tight fit into the holes in the mold is needed to ensure precision when using the pin for locating (precisely positioning) the pre-cured plies and for precise indexing of the part for subsequent trimming, handling, or assembly operations. Solid plastic (e.g., polytetrafluoroethylene (PTFE) or Teflon™) tool pins are commonly used during the fabrication of composite parts, because cured resin does not bond to their surface. PTFE is, however, relatively soft, and there is no reliable way to grasp and remove the pins without causing permanent deformation and damage to the pin. For example, pliers, chisels, knives, and drills are typically used to remove single-use solid PTFE/Teflon™ tool pins, which can result in safety and ergonomic issues as well as damage to the part or to the mold (e.g., tool bushings provided in the mold to hold the tool pin). Thus, PTFE (or other non-bonding plastic) tool pins are routinely discarded after damage resulting from only one use, incurring waste, expense, and adverse environmental impact. For example, thousands of non-recyclable, non-compostable damaged PTFE/Teflon™ tool pins are discarded into landfills every year. Steel tool pins are much more durable than PTFE and can also be made to accommodate a safe reliable removal tool, but cured resin is much more likely to bond to the steel surface, which makes their removal very difficult and inconsistent.

Accordingly, there exists a need in the art for re-useable, easily removable tool pins for molding of composite materials.

SUMMARY

In one embodiment, hybrid tool pins are tool pins which have a metal core surrounded by a plastic sleeve, which creates a durable and reusable tool pin that does not stick to cured resin. The plastic sleeve, by not bonding to the resins and adhesives used for composite part molding, and the metal core, by providing a reliable attachment point for engaging an extraction tool, together allow for safe and easy removal of the tool pin from the mold and the cured part using the extraction tool. The extraction tool can be ergonomic, for use as a hand tool, which mechanically attaches to the metal core by means of threads, grooves or similar mechanical retention geometry, and is easily detachable from the core without damage to the tool pin. The tool pin can also be made to be "mistake-proof" by being shaped or otherwise having physical features that allow only one way of inserting the tool pin into a tool pin hole in the mold. The mistake-proof feature ensures that the pin is not inserted in such a way that the extraction tool engagement in the tool pin becomes inaccessible.

In one embodiment, a tool pin includes a core having an extractor tool engagement configured to engage an extractor tool and a low-friction cylindrical sleeve surrounding at least a central portion of the core. The core is configured to mechanically hold the sleeve in place on the core, and the core is made of sufficiently hard material to engage the extractor tool without damage to the core.

In another embodiment, a method includes inserting into a hole of a mold tool a tool pin having a core made of a first material, the core having an extractor tool engagement, and the tool pin having a low-friction cylindrical surface made of a second material such that the low-friction cylindrical surface of the tool pin surrounds the core and makes a contact fit with an interior surface of the hole; and removing the tool pin from the hole using the extractor tool engagement to grip the tool pin using an extractor tool.

In still another embodiment, a system for precision molding of composite material parts includes a mold having a hole in a mold line surface and a hybrid tool pin having a core with an extractor tool engagement and a plastic sleeve surrounding the core and sized to fit in the hole so as to make a contact fit. The system may further include an extractor tool configured to engage the extractor tool engagement of the core.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

To address the need in the art for re-useable, easily removable tool pins for molding of composite materials, a hybrid tool pin is disclosed that features a non-stick outer surface with a harder inner core configured to be gripped by a removal tool for extraction of the tool pin, without damage, from a mold and from composite plies on the mold that may have cured in contact with the tool pin. The tool pin is part of a system that includes the tool pin, a mold (or mandrel) having one or more holes to accept the tool pin, and an extractor tool specifically adapted to grip the tool pin. The extractor tool can be ergonomically designed for easy removal of the tool pin by hand from the mold and the molded part. Furthermore, the tool pin according to one or more embodiments is configured such that the tool pin cannot be inserted into the mold so that the extractor tool engagement of the tool pin does not face out. In other words, the tool pin is "mistake-proof" insofar as being insertable into the mold in only one direction such that the extractor tool fitting of the pin is exposed for engagement with the extractor tool for removal. For example, for round (circular cross section) tool pins, a flange with diameter larger than the hole diameter is provided at the end of the tool pin having the extractor tool engagement and prevents insertion of the pin in such a way that the extractor tool engagement ends up inside the hole.

Systems and methods of using the tool pins, molds, and extraction tools according to one or more embodiments improve efficiency and safety in the production of molded composite materials parts and decreases the negative environmental impact of discarding non-compostable, single-use, solid PTFE/Teflon™ tool pins. For example, efficiency is improved by making the tool pins easily removable using a specifically adapted tool that does not damage the tool pins. The improvement is by way of comparison to the difficulty of removing prior art plastic tool pins using ad hoc tools, such as pliers, chisels, knives, and drills, that damage or destroy single-use tool pins in the process of removing them. Removing a conventional single-use solid plastic tool pin, for example, by drilling it out has the potential to damage the tool tab hole (e.g., compromising the exact location of the tool tab hole for indexing) or damage the mold (e.g., the hole in the bushing of the mold tool that lines the hole in the mold). Removal is therefore more efficient by being faster and more reliable, and does not create waste of single-use pins. Cost savings can be dependent on the quantity, configuration (size) and life cycle of the tool pins being used. For example, if a re-useable tool pin according to one embodiment costs as much as a dozen single-use tool pins, but can be re-used dozens of times, there is an obvious cost savings. Tool pins, methods and systems according to various embodiments have application in a wide range of global composite manufacturing industries, e.g., aerospace, automotive, transportation, agricultural, and energy (e.g., wind turbines), or any other industry or company that may be engaged in the production of parts from composite materials.

In the disclosed embodiments, hybrid tool pins are round tool pins which have a metal core surrounded by a plastic (e.g., PTFE/Teflon™) sleeve, which creates a durable and reusable tool pin that does not stick to cured resin and is more easily withdrawn from the hole in the mold. The plastic sleeve, by not bonding to the resins and adhesives used for composite part molding, allows for safe and easy removal of the tool pin from the mold and the cured part using an extraction tool, which mechanically attaches to the metal core by means of screw threads. The disclosed embodiments show a round sleeve held in place by retention flanges on the core, with one flange having a diameter less than that of the sleeve and the other flange having a diameter greater than that of the sleeve, so that, with the sleeve sized to be a close tolerance fit (e.g., a snug or tight fit) to the hole (e.g., bushing) in the mold, the tool pin can only be inserted in one way, the small-flange end going first into the hole in the mold. As described above, the large flange can be used not only for retention of the sleeve on the core, but also makes the tool pin "mistake-proof". Close tolerance fit of the sleeve into the hole in the mold ensures accuracy and repeatability in the placement of the pin for the locating and indexing functions of the pin and the resultant hole formed in the part or the tool tab of the part, reducing or minimizing variability among parts coming from the same mold. Snug or tight fit of the sleeve into the hole in the mold also prevents the resin or adhesive for bonding the composite plies from bleeding into the hole or bushing of the mold. The extraction tool can be ergonomically designed for use as a hand tool, e.g., having a rounded handle that can be easily gripped and used to apply force to the tool pin without injury to the user's hand. In alternative embodiments, the extractor tool can engage or attach to the tool pin using grooves, keys, or similar mechanical retention geometry that allows for release of the tool pin from the tool after extraction. Alternative embodiments also may have other than round cross sections for the sleeve and the core, differing retention of the sleeve to the core, and be constructed of different materials than the disclosed embodiments.

Figure 1:
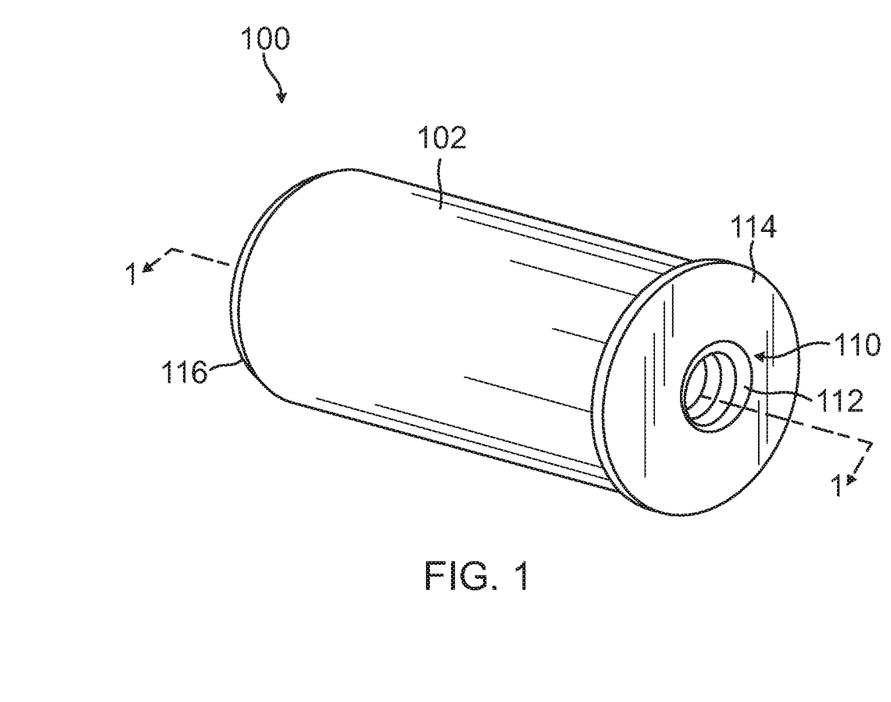
FIG. 1 is a perspective view diagram of a removable, reusable tool pin, in accordance with one embodiment of the disclosure.

FIG. 1 illustrates a removable, reusable tool pin 100, in accordance with one embodiment. Tool pin 100 may include a sleeve 102 surrounding a core 110. Sleeve 102 may be comprised of a plastic such as polytetrafluoroethylene (PTFE), more commonly known as Teflon™. For functionality of tool pin 100, sleeve 102 may comprise any plastic having reasonably low friction with the surface of the hole in the mold into which tool pin 100 will be inserted and which does not bond easily to the resins and adhesives used in the particular manufacture in which the tool pin is employed. Teflon™ works well for use with tool pin 100 insofar as Teflon™ provides a slippery surface that does not bond easily, is relatively inexpensive, and is readily available. Core 110 may include an extractor tool engagement 112. In the embodiment shown in the figures, extractor tool engagement 112 is a hole with screw threads which an extractor tool 130 with matching threads can be screwed into to grip tool pin 100 for extraction and screwed out of to release tool pin 100 for re-use. Core 110 also may include retention flanges 114 and 116 that retain sleeve 102 on the central portion of core 110. Retention flange 114, located at the end of core 110 having extractor tool engagement 112 may have a diameter that is larger than the diameter of the sleeve, which matches the diameter of the tool pin hole in the mold, so that retention flange 114 prevents insertion of the extractor tool engagement 112 into the tool pin hole in the mold. Conversely, retention flange 116, located at the end of core 110 not having extractor tool engagement 112 has a diameter that is smaller than the diameter of the sleeve and the matching diameter of the tool pin hole, so that retention flange 116 allows insertion of the non-extractor tool engagement end of the tool pin into the tool pin hole. In other words, core 110 is configured to be insertable into the tool pin hole only in such a way that extractor tool engagement 112 is accessible.

Figure 2:
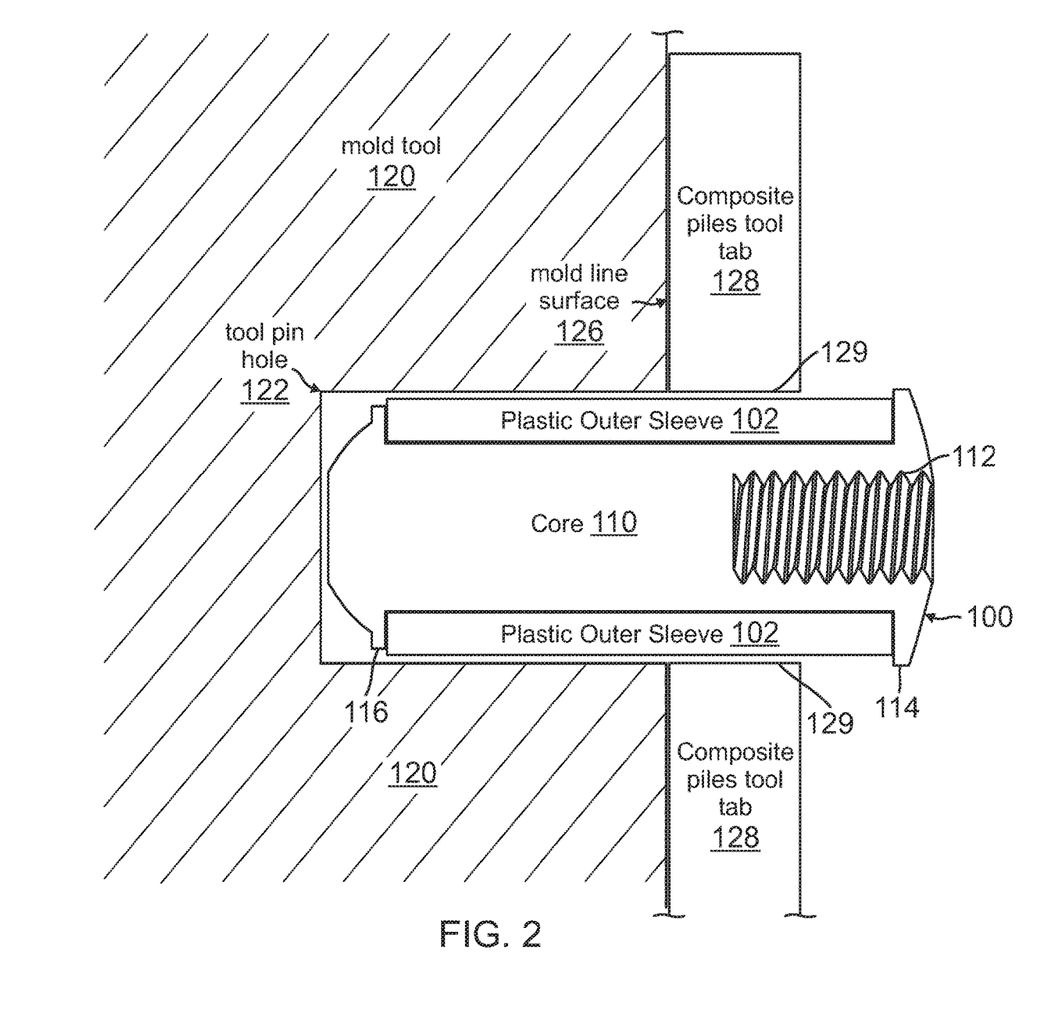
FIG. 2 is a cross-sectional diagram of a tool pin, taken along line 1-1 shown in FIG. 1, also showing a cross section of a mold tool and a composite part in place on the mold tool, in accordance with an embodiment of the disclosure.

FIG. 2 shows a cross section of a tool pin, a mold tool, and a composite part in place on the mold tool, in accordance with an embodiment. FIG. 2 shows mold tool 120 having tool pin hole 122. For clarity of illustration, tool pin hole 122 is shown with a gap between tool pin hole 122 and sleeve 102, but tool pin hole 122 and sleeve 102 are sized for a close tolerance fit of tool pin 100 into tool pin hole 122 to have a contact fit with no gap. FIG. 2 also more clearly shows small retention flange 116 and large retention flange 114 for retaining plastic sleeve 102 on tool pin core 110. Large flange 114 also ensures that extractor tool engagement 112 remains accessible after insertion of tool pin 100 into tool pin hole 122. Tool tab 128, comprising composite plies laid up on mold line surface 126 of mold tool 120, is shown with tool tab hole 129 surrounding sleeve 102.

Figure 3A:
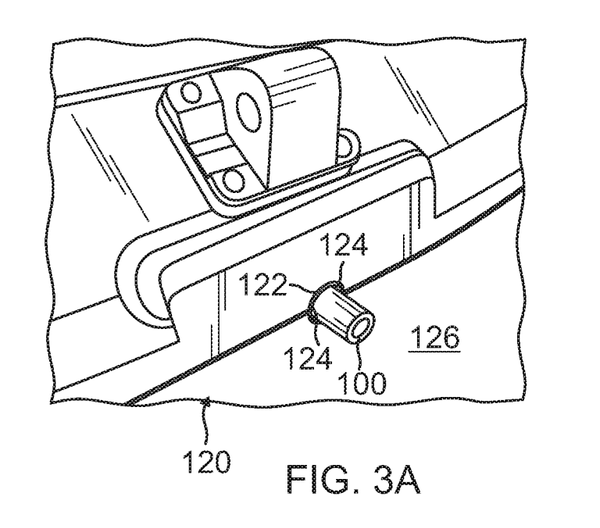
FIG. 3A is a perspective view of a tool pin inserted in a mold tool.

FIG. 3A shows a tool pin 100 inserted in a mold tool 120. Tool pin 100 is held in place in mold tool 120 by friction and contact fit of sleeve 102 in tool pin hole 122. Tool pin hole 122 is shown surrounded by mold tool bushing 124, which fits into mold tool 120. Mold tool bushing 124 could, for example, be replaced in case of damage to tool pin hole 122 without having to replace entire mold 120 in order to repair the hole. As shown in FIG. 3A, the mold tool 120 with protruding tool pin 100 is ready for lay up of composite plies onto mold line surface 126 for forming a composite part having a tool tab surrounding tool pin 100.

Figure 3B:
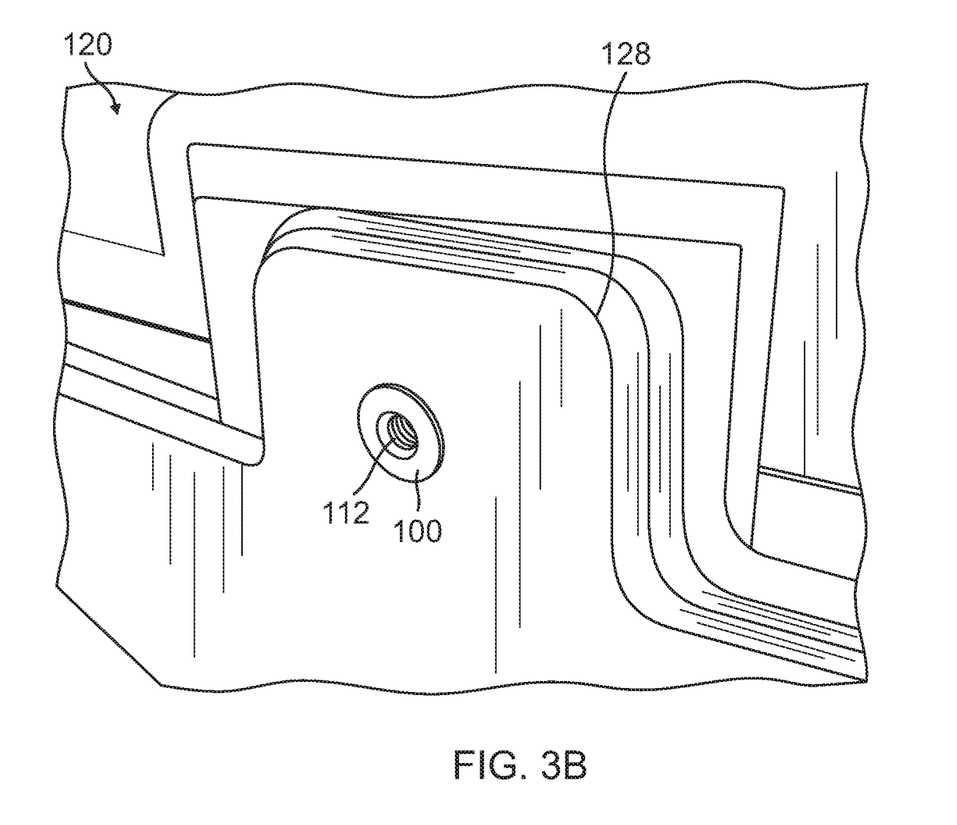
FIG. 3B is a perspective view of a composite tool tab of a composite part formed around the tool pin on the mold tool shown in FIG. 3A, in accordance with an embodiment of the disclosure.

FIG. 3B shows mold tool 120 with lay up of composite plies onto to mold 120 forming a portion of a composite part having a tool tab 128 surrounding tool pin 100. Such tool tabs are widely used across industries involved in parts manufacture regardless of the size and shape of the mold tool or the type of materials used to form the part. Using a tool tab with a locating hole for locating (e.g., placing a part in a correct position) and indexing (e.g., finding precise locations on the part) also is a very common technique for composite fabrication that is widely used during the manufacturing process.

Extractor tool engagement 112 can be seen remaining accessible for extraction of tool pin 100 from mold tool 120 and tool tab 128. FIG. 3B also shows a residue of resin or adhesive surrounding the protruding part of tool pin 100. The plastic (e.g., Teflon™) sleeve 102 is adapted for release from such residue, and extractor tool engagement 112 remains accessible despite such residue, which can inhibit or make more difficult the removal of conventional tool pins.

Figure 4:
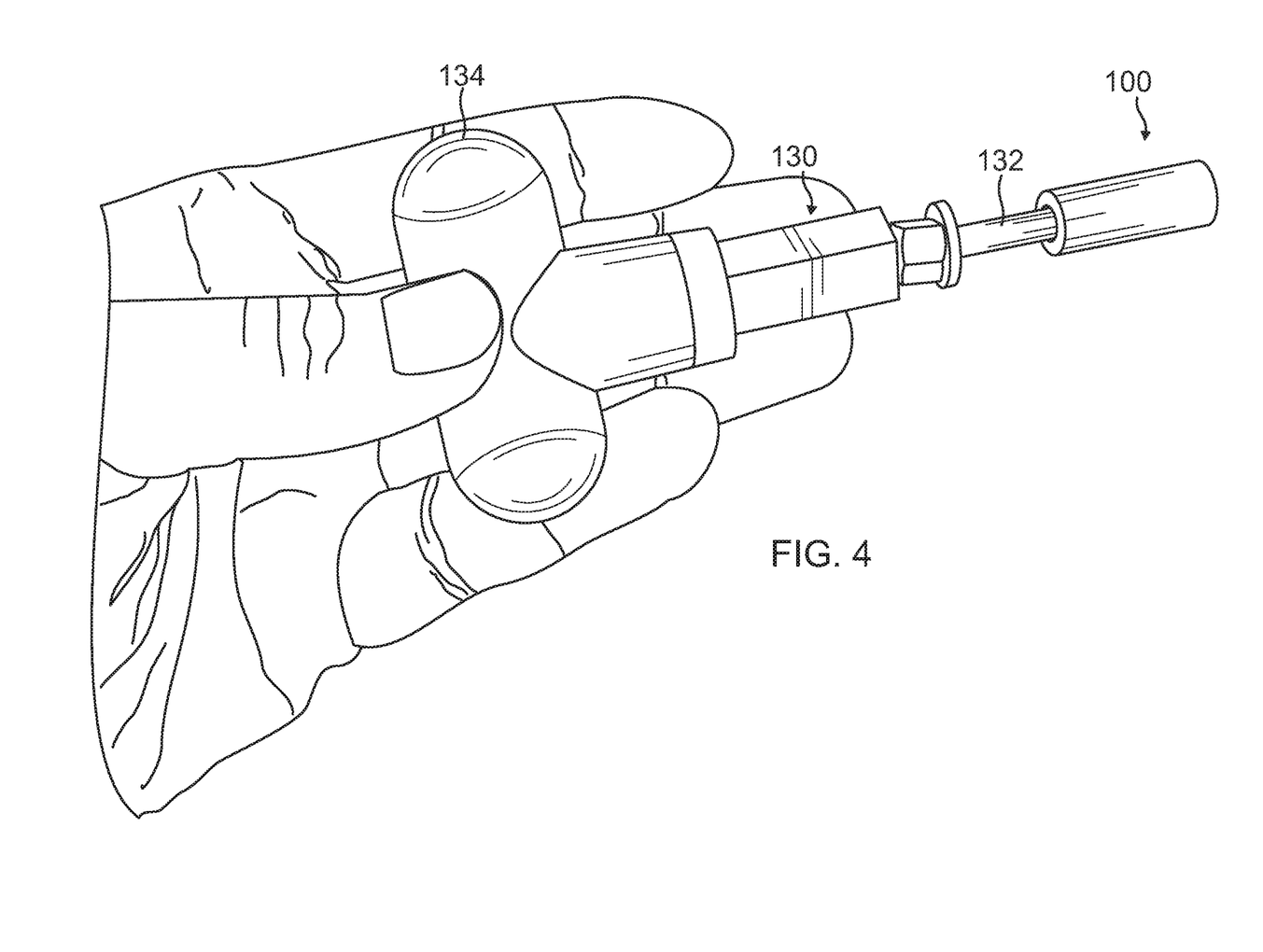
FIG. 4 is a perspective view of a tool pin extractor tool, in accordance with an embodiment of the disclosure.

FIG. 4 shows a tool pin extractor tool 130, in accordance with an embodiment. Extractor tool 130 includes an engagement portion 132 for attaching to extractor tool engagement 112 of core 110. For the disclosed embodiments, engagement portion 132 may be a bolt or screw with threads that match or engage the threads of extractor tool engagement 112 of core 110. FIG. 4 shows extractor tool 130 engaged or attached to tool pin 100, and extractor tool 130 can be disengaged from tool pin 100 by simply unscrewing engagement portion 132 from tool pin 100, e.g., from extractor tool engagement 112 of core 110. In other embodiments, engagement portion 132 may include grooves, keys, or similar mechanical retention geometry that allows for release of the tool pin from the tool after extraction. In another embodiment, extractor tool engagement 112 of core 110 could be external to core 110 instead of internal as in the disclosed embodiments, and engagement portion 132 could be configured to grip external extractor tool engagement 112 appropriately. For example, engagement portion 132 could have internal threads if extractor tool engagement 112 had external threads or could use a pliers-like grip on the external extractor tool engagement 112. Such an external extractor tool engagement 112 could also provide the wrong-way insertion prevention function described for large retention flange 114.

Extractor tool 130 may include a handle 134 that fits ergonomically to a user's hand for hand extraction of tool pin 100 from mold 120. When engaged, interlocked, or attached to (e.g., screwed into) extractor tool engagement 112 of core 110, handle 134 can be used with extractor tool 130 to form a grip on tool pin 100 that enables ready removal of tool pin 100 from mold 120 and tool tab 128 without damage to the tool pin 100 or mold 120. Handle 134 can also provide a grip for unscrewing or otherwise detaching extractor tool 130 from tool pin 100 without damage to tool pin 100 so that tool pin 100 can be re-used.

Figure 5:
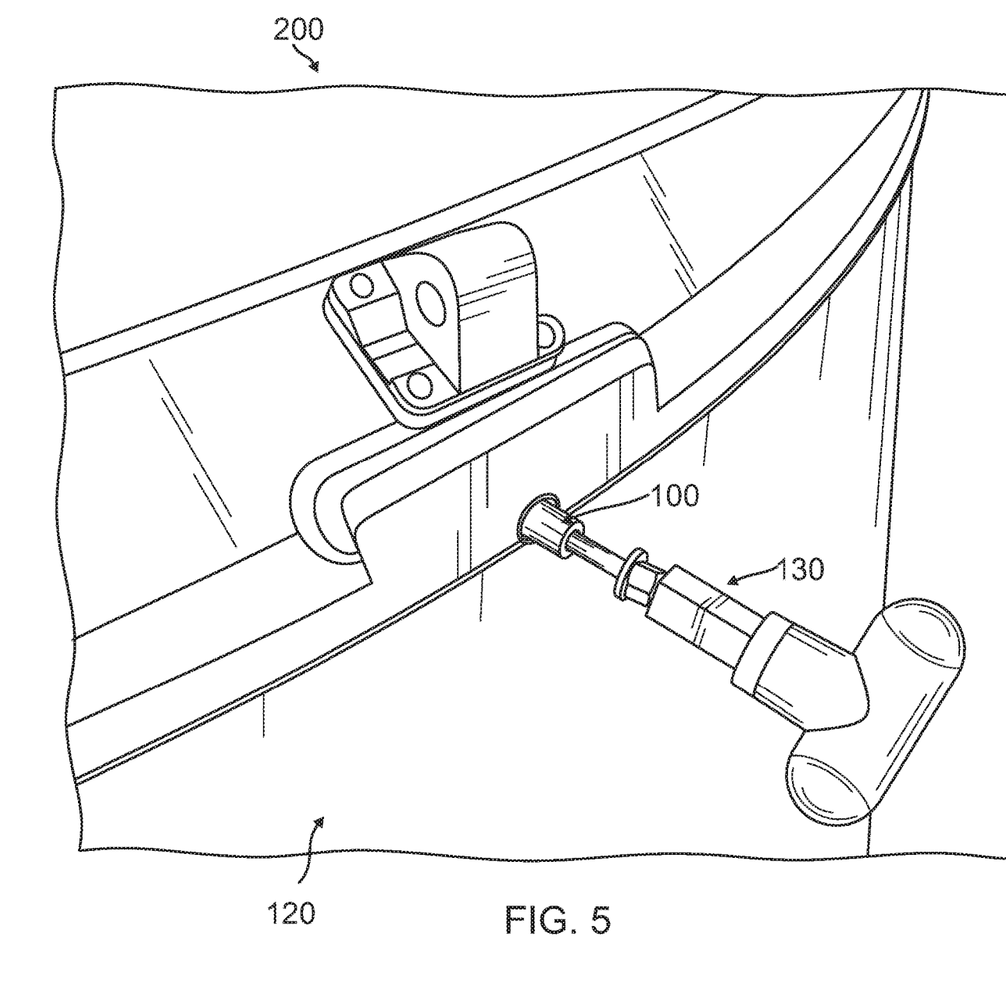
FIG. 5 is perspective view of a system of providing a mold with removable and reusable tool pins, such as may be useful in the manufacture of parts from molded composite materials, in accordance with an embodiment of the disclosure.

FIG. 5 illustrates a system 200 for composite materials parts molding using removable and reusable tool pins, such as tool pin 100, in accordance with an embodiment. System 200 may include a tool pin, such as tool pin 100, and a mold tool 120, such as shown in and described with reference to FIG. 2, FIG. 3A and FIG. 3B, for example. System 200 also may include an extractor tool 130, such as shown in and described with reference to FIG. 4, for example. FIG. 5 shows elements of system 200 interacting with one another in that tool pin 100 fits tightly into mold 120 and can be extracted from mold 120 with extractor tool 130 when extractor tool 130 is interlocked or attached to tool pin 100.

Extractor tool 130 can be detached or disengaged from tool pin 100, for example, by unscrewing extractor tool 130.

Figure 6A:
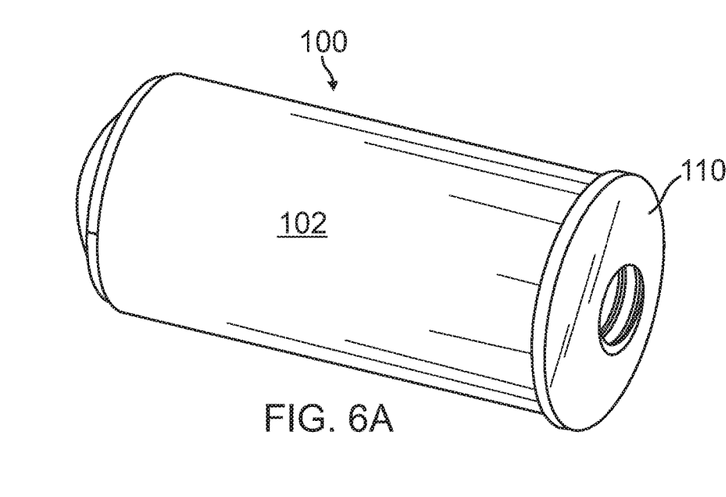
FIGS. 6A, 6B, and 6C are pictorial diagrams, in which FIGS. 6B and 6C more clearly illustrate various components of the tool pin shown in FIG. 6A to illustrate one example of the construction of a removable, reusable tool pin, in accordance with one embodiment of the disclosure.
Figure 6B:
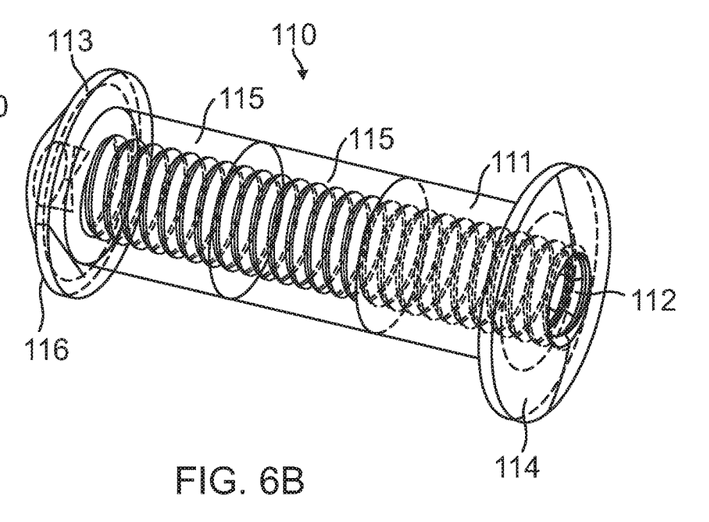
Figure 6C:
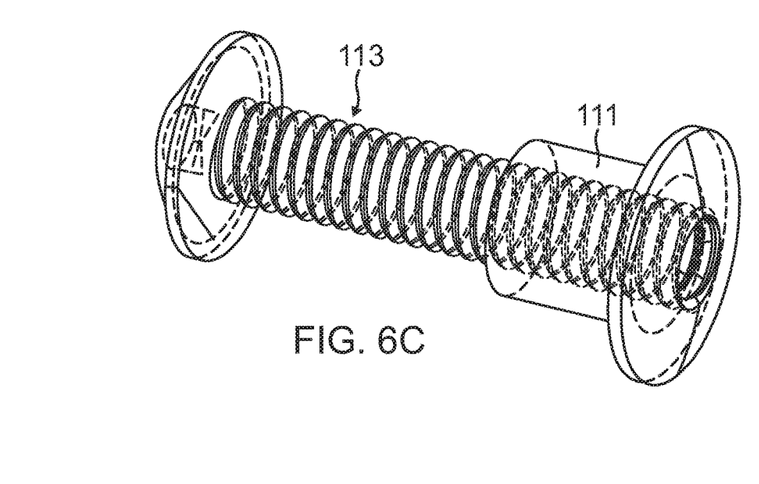

FIGS. 6A, 6B, and 6C illustrate various components of a tool pin 100 for one example of the construction of a removable, reusable tool pin, in accordance with an embodiment. FIGS. 6A-6C show one particular example of construction of a tool pin 100 according to one embodiment. FIG. 6A provides an overall view of tool pin 100 showing Teflon™ sleeve 102 and metal (e.g., steel) core 110. FIG. 6B shows tool pin 100 of FIG. 6A with sleeve 102 removed so that core 110 is visible. Core 110, in this embodiment, comprises binding post 111 (also commonly referred to as a "barrel nut") which is threaded for screwing onto hex drive screw 113. FIG. 6C shows core 110 of FIG. 6B with threaded standoffs 115 removed so that hex drive screw 113 is more clearly shown. Returning to FIG. 6B, threaded standoffs 115 are threaded onto hex drive screw 113 to provide a stop for binding post 111 to torque down against when screwed onto hex drive screw 113 so that core 110 is assembled into a mechanically stable unit. In order to ensure that core 110 stays together, the threads of hex drive screw 113 and binding post 111 may be treated with a thread lock compound before final assembly torque is applied. After final assembly of hex drive screw 113 and binding post 111, hex drive screw 113 is not threaded all the way into binding post 111, so that some empty threads remain in binding post 111 to form the threads of extractor tool engagement 112.

The head of hex drive screw 113 forms small retention flange 116 and the head of binding post 111 forms large retention flange 114. Standoffs 115 are of a length such that the distance between small retention flange 116 and large retention flange 114 matches the length of sleeve 102. Also, the outer diameter of standoffs 115 matches the inner diameter of sleeve 102. Thus, when binding post 111 is fully torqued onto hex drive screw 113, sleeve 102 is not compressed or deformed between flanges 114 and 116, yet sleeve 102 is firmly and stably held in place on core 110. Two standoffs 115 are shown for the example illustrated by FIG. 6, but more or less number of standoffs 115 can be used, along with different length hex drive screw 113 and different length sleeve 102 to vary the length of tool pin 100 as needed.

Figure 7:
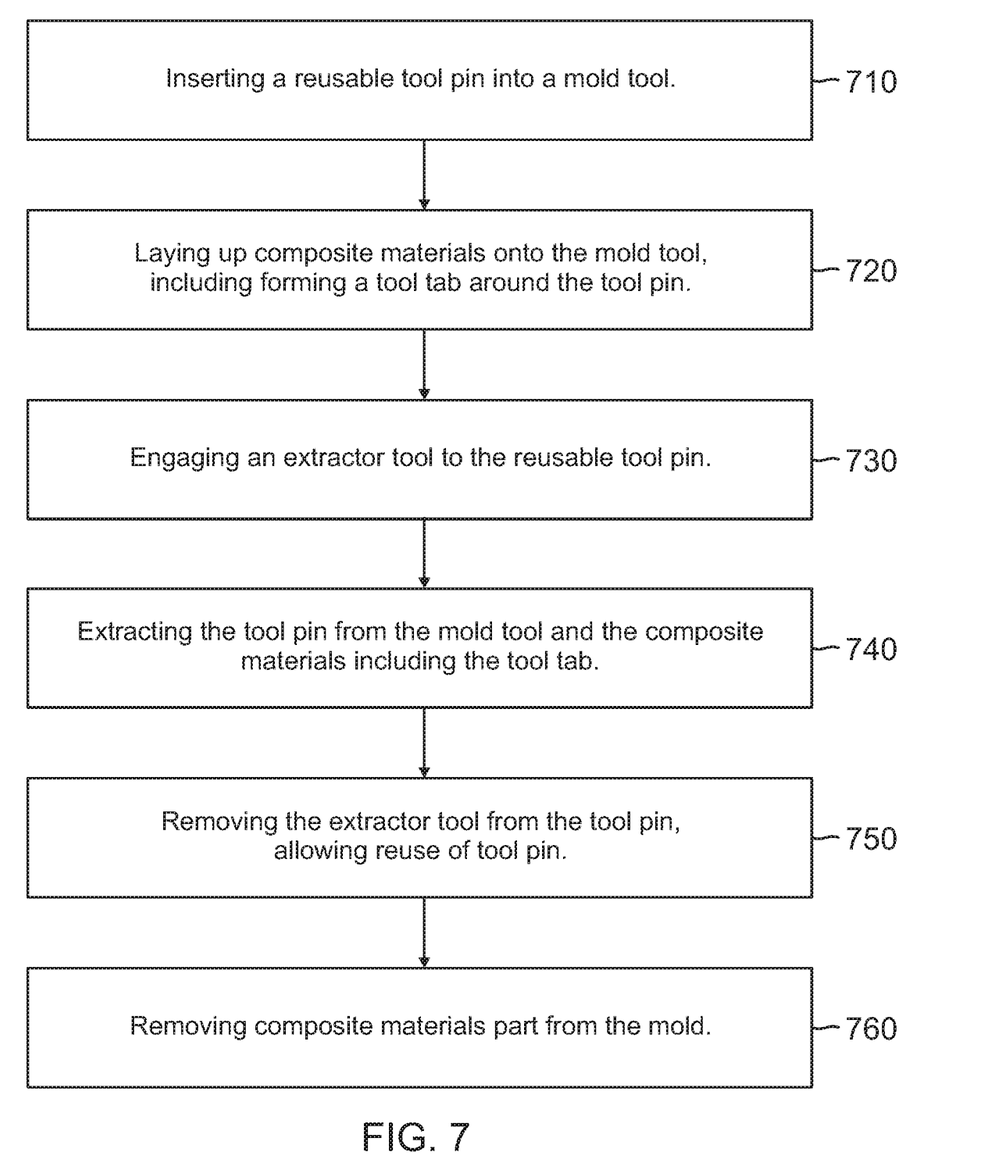
FIG. 7 is a flow diagram of a method of fabricating a composite materials part using a mold tool, a tool pin, and tool pin extractor tool, in accordance with an embodiment of the disclosure.

FIG. 7 illustrates a method of fabricating a composite materials part using a mold tool, a tool pin, and tool pin extractor tool, in accordance with an embodiment. The method includes an act 710 of inserting a reusable tool pin into a mold tool, such as inserting tool pin 100 into hole 122 of mold tool 120, to make a close-tolerance, contact fit of the tool pin 100 to the matching size hole 122. Act 710 may further include preventing insertion of tool pin such that the extractor tool engagement becomes inaccessible. For example, a large flange 114 at the same end of tool pin 100 as extractor tool engagement 112 can prevent insertion of extractor tool engagement 112 into the hole 120 and ensure that extractor tool engagement 112 remains accessible after insertion.

The method includes an act 720 of laying up composite materials onto the mold tool, including forming a tool tab around the tool pin, such as tool tab 128. An act 730 of engaging an extractor tool to the reusable tool pin may be performed, for example, by screwing threaded engagement portion 132 of tool pin extractor tool 130 into screw threads of extractor tool engagement 112 of core 110. An act 740 may include extracting the tool pin from the mold tool and the composite materials including the tool tab, for example, by gripping ergonomic handle 134 of extractor tool 130 engaged with extractor tool engagement 112 of core 110 to form a grip on tool pin 100 that allows removal of tool pin 100 from the mold tool 120 and the composite materials of tool tab 128. The method may include an act 750 of removing the extractor tool from the tool pin, allowing reuse of tool pin, for example, by unscrewing threaded engagement portion 132 of tool pin extractor tool 130 from screw threads of extractor tool engagement 112 of core 110 of tool pin 100. The method may further include an act 760 of removing the composite materials part from the mold. For example, the cured part, which may include tool tab 128, may be removed from the mold tool 120.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A tool pin comprising:
   a core comprising a screw portion and a binding portion threaded to the screw portion to at least partially surround the screw portion, the binding portion comprising a threaded portion configured to engage the screw portion and an extractor tool; and
   a cylindrical sleeve surrounding at least a portion of the binding portion, wherein:
   the sleeve is configured to maintain a generally cylindrical shape when inserted into a hole of a mold tool;
   the core is configured to mechanically hold the sleeve in place on the core; and
   the core comprises a material that is harder relative to the sleeve to engage the extractor tool without damage to the core.

2. The tool pin of claim 1, further comprising:
   a first cylindrically shaped flange disposed adjacent the threaded portion at a first end of the tool pin and having a diameter larger than an outer diameter of the cylindrical sleeve such that insertion of the first end of the tool pin into the hole matching the outer diameter of the cylindrical sleeve is prevented.

3. The tool pin of claim 1, wherein the core further comprises a second cylindrically shaped flange disposed at an insertable end of the core and having a diameter smaller than an outer diameter of the cylindrical sleeve and larger than an inner diameter of the cylindrical sleeve, the second flange configured to mechanically hold the sleeve in place on the core and allow insertion of the insertable end of the core into the hole of the same diameter as the outer diameter of the cylindrical sleeve.

4. The tool pin of claim 1, wherein the core comprises a metal and the cylindrical sleeve comprises polytetrafluoroethylene (PTFE).

5. The tool pin of claim 1, wherein the screw portion comprises a screw having a round head, the head having a diameter smaller than an outer diameter of the cylindrical sleeve and larger than an inner diameter of the cylindrical sleeve.

6. The tool pin of claim 1, wherein a portion of a screw threading of the binding portion is configured to form the threaded portion.

7. The tool pin of claim 1, wherein the binding portion has a round head having a diameter larger than an outer diameter of the cylindrical sleeve.

8. The tool pin of claim 1, wherein the core comprises a standoff having an outer diameter configured to provide a contact fit of the standoff to an inside surface of the cylindrical sleeve.

9. The tool pin of claim 1, wherein the core comprises one or more standoffs, the one or more standoffs configured to screw onto the screw portion, the one or more standoffs having a total length such that with the one or more standoffs and the binding portion fully engaged with the screw portion, a distance between a head of the screw portion and a head of the binding portion is no less than a length of the cylindrical sleeve.

10. A method of operating the tool pin of claim 1, the method comprising:
    inserting the tool pin into the hole of the mold tool such that the sleeve makes a contact fit with an interior surface of the hole; and
    removing the tool pin from the hole using the threaded portion to grip the tool pin.

11. The method of claim 10, wherein the tool pin has a feature that prevents insertion of one end of the tool pin into the hole; and the method further comprises preventing insertion of the tool pin such that the threaded portion becomes inaccessible.

12. The method of claim 10, wherein removing the tool pin further comprises engaging an extractor tool with the threaded portion to form a grip on the tool pin using the extractor tool.

13. The method of claim 12, further comprising disengaging the extractor tool from the threaded portion, allowing reuse of the tool pin.

14. The method of claim 10, further comprising curing a composite material situated on the mold tool and surrounding a portion of the tool pin protruding from the hole of the mold tool.

15. The method of claim 14, wherein removing the tool pin further comprises removing the tool pin from the cured composite material.

16. The method of claim 10, wherein the core comprises a metal and the sleeve comprises polytetrafluoroethylene (PTFE).

17. A system for precision molding of composite material parts using the tool pin of claim 1, the system comprising:
    a mold having the hole in a mold line surface; and
    the tool pin wherein the sleeve is a plastic sleeve sized to fit in the hole so as to make a contact fit.

18. The system of claim 17, further comprising an extractor tool configured to grip the tool pin by engaging the threaded portion to remove the tool pin from the hole.

19. The system of claim 17, wherein the tool pin is configured to prevent inserting the threaded portion into the hole.

20. The system of claim 1, wherein the threaded portion comprises threads that are internal to the core.

* * * * *